(12) United States Patent
Chung et al.

(10) Patent No.: US 6,824,910 B2
(45) Date of Patent: Nov. 30, 2004

(54) CO-FLOW PLANAR SOFC FUEL CELL STACK

(75) Inventors: Brandon W. Chung, Dublin, CA (US); Ai Quoc Pham, San Jose, CA (US); Robert S. Glass, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 68 days.

(21) Appl. No.: 09/769,211

(22) Filed: Jan. 24, 2001

(65) Prior Publication Data

US 2002/0106548 A1 Aug. 8, 2002

(51) Int. Cl.[7] .......................... H01M 2/08; H01M 2/14
(52) U.S. Cl. ........................ 429/35; 429/38; 429/39
(58) Field of Search ................. 429/30, 34, 38, 429/39, 42, 35

(56) References Cited

U.S. PATENT DOCUMENTS

| | | | |
|---|---|---|---|
| 3,526,549 A | | 9/1970 | Archer et al. |
| 4,590,135 A | * | 5/1986 | Warszawski et al. .......... 429/38 |
| 4,761,349 A | | 8/1988 | McPheeters et al. ........... 429/39 |
| 4,997,726 A | * | 3/1991 | Akiyama et al. .............. 429/32 |
| 5,227,256 A | | 7/1993 | Marianowski et al. ......... 429/16 |
| 5,270,129 A | | 12/1993 | Ishida |
| 5,480,738 A | | 1/1996 | Elangovan et al. ............ 429/32 |
| 5,482,792 A | * | 1/1996 | Faita et al. .................... 429/30 |
| 5,532,073 A | | 7/1996 | Hirata et al. |
| 5,549,983 A | | 8/1996 | Yamanis ....................... 429/32 |
| 6,180,274 B1 | * | 1/2001 | Yoshimoto et al. ........... 429/34 |

FOREIGN PATENT DOCUMENTS

| | | |
|---|---|---|
| EP | 0620608 A1 | 10/1994 |
| EP | 0961333 A1 | 1/1999 |
| WO | WO 98/57384 A1 | 12/1998 |

OTHER PUBLICATIONS

"Effect of Cell Configuration and Fuel on SOFC Modeling", A. Malandrino et al, Electrochemical Society, Inc. 1993, p. 885–894.

K. Ogasawara et al, "Recent Advances In Planar SOFC Development at Tokyo Gas", Electrochemical Proceedings vol. 97–18.

* cited by examiner

*Primary Examiner*—Patrick Ryan
*Assistant Examiner*—Julian Mercado
(74) *Attorney, Agent, or Firm*—James S. Tak; Alan H. Thompson; Eddie E. Scott

(57) ABSTRACT

A co-flow planar solid oxide fuel cell stack with an integral, internal manifold and a casing/holder to separately seal the cell. This construction improves sealing and gas flow, and provides for easy manifolding of cell stacks. In addition, the stack construction has the potential for an improved durability and operation with an additional increase in cell efficiency. The co-flow arrangement can be effectively utilized in other electrochemical systems requiring gas-proof separation of gases.

21 Claims, 1 Drawing Sheet

CO-FLOW PLANAR SOFC FUEL CELL STACK

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to fuel cells, particularly to solid oxide fuel cell (SOFC) stacks, and more particularly to a co-flow or counter flow planar fuel cell stack with an integral, internal manifold and a cell casing holder to separately seal the cell, thus providing improved sealing and gas flow as well as easy manifolding of cell stacks.

Solid oxide fuel cells are one of the most promising technologies for power generation. Like all fuel cells, SOFC cells are composed of two electrodes (anode and cathode) and an electrolyte. Since each single cell has a maximum voltage of about IV only, several cells must be stacked together in a stack to yield high voltages for practical applications. The stacking of the cells needs to address the gas flow distribution in the stack as well. The SOFC design closest to commercialization is the tubular design which can be assembled into larger units without the need of a seal. This sealess design is its biggest engineering advantage. However, the tubular geometry of these fuel cells limits the specific power density to low values because the electrical conduction paths are long, leading to high energy losses from internal resistance heating. For these reasons, other fuel cell constructions are being actively pursed at the present time.

The most common alternative design is a planar arrangement with a cross-flow or radial flow arrangement. These planar fuel cells are constructed from alternating flat single cells, which are trilayer cathode electrolyte anode structures, and bipolar plates, which conduct current from cell-to-cell and provide channels for gas flow. Each individual cell, and the bipolar plate associated with every cell in the stack must be sealed together so that they are gas-tight at each manifold face. In addition the manifolds must be sealed gas-tight to the stack to prevent fuel and oxidant gas cross-leakage. The cross-leakage can compromise cell efficiency and is hazardous due to the possibility of explosion. Sealant materials which have thermal expansion coefficent matching with other components of the stack and with satisfactory durability at operating temperatures are not available at the present time. This presents a serious technological shortcoming for planar solid oxide fuel cells.

Planar fuel cell stacks may also be constructed using a co-flow or counter-flow configuration with internal manifolds, as exemplified by U.S. Pat. No. 4,761,349 issued Aug. 2, 1988; No. 5,227,256 issued Jul. 13, 1993; No. 5,480,738 issued Jan. 2, 1996; and No. 5,549,983 issued Aug. 27, 1996. However, most of these designs were mainly developed for electrolyte-supported cells (thick electrolyte with thin electrodes). Since the electrolyte membranes are impervious, the sealing and the stack design are not as complex as for electrode-supported cells (one thick electrode serving as support and a thin film electrolyte). However, the electrode-supported cells have significantly higher performance than the electrolyte-supported cells because of lower resistance of the thin film electrolyte.

In some of the proposed designs such as the conventional cross-flow configuration, the sealing must be done at the edge and corner, which result in higher risk of leakage due to small seal area and less durable stack. Most of the stack designs proposed for electrolyte-supported cells are not applicable to electrode-supported cells because of the leakage through the porous electrode support.

The present invention provides a solution to the above-mentioned problems of planar fuel cell stacks, by providing a planar stack design with separate cell holders for improved sealing and reduced thermal stress problems. This design is particularly suitable for electrode-supported fuel cells because it promote face seal instead of corner seal; however, the design is applicable to electrolyte-supported cells as well. A key feature of the present invention is the cell holder that is separate from the interconnect itself.

SUMMARY OF THE INVENTION

It is an object of the present invention to provide an improved fuel cell stack.

A further object of the invention to provide a co-flow planar solid oxide fuel cell stack.

Another object of the invention is to provide a method of constructing a fuel cell stack which can also be used in electrolysis, gas separation, and other electrochemical systems requiring gas-proof separation of gases.

Another object of the invention is to provide a co-flow planar stack with integral, internal manifolding and a casing/holder to separately seal a cell using coventional sealing materials such as ceramic, glass, or glass-ceraminic based sealants.

Another object of the invention is to provide a co-flow planar stack which improves sealing and gas flow, and provides for easy manifolding of cell stacks.

Another object of the invention is to provide a co-flow stack and cell casing/holder which provides improved durability and operation with an additional increase in cell efficiency.

Other objects and advantages of the present invention will become apparent from the following description and accompanying drawings. Basically the invention provides a co-flow planar stack arrangement which can be utilized for solid oxide fuel cells and other electrochemical systems requiring separation of incompatible gases, such as used in electrolysis, gas separation, gas sensors, etc. The present invention overcomes the cross-leakage and other problems associated with prior planar fuel cell stacks designs, by providing a co-flow planar stack with integral, internal manifolding and a cell casing/holder to separately seal each cell using sealants such as materials based on ceramic, glass, or glass-ceramic. Such construction improves sealing and gas flow, and enables easy manifolding of cell stacks. The present invention utilizes a casing/holder containing a cell located intermediate a pair of flow channel/interconnects, with each cell having two pairs of openings at opposite ends which provide the separated co-flow of the fuel and oxidant gases.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention provides a unique construction for solid oxide fuel cells (SOFC) stacks. This construction improves sealing and manifolding problems of the cross-flow, counter flow, and radial-flow panar construction and, at the same time provides for co-flow of fuel and oxidant gases. A multi-cell (two cell) embodiment is shown in FIG. 1, with FIG. 2 illustrating enlarged exploded view of the components forming a single unit of the multi-cell of FIG. 1.

Figure 1:
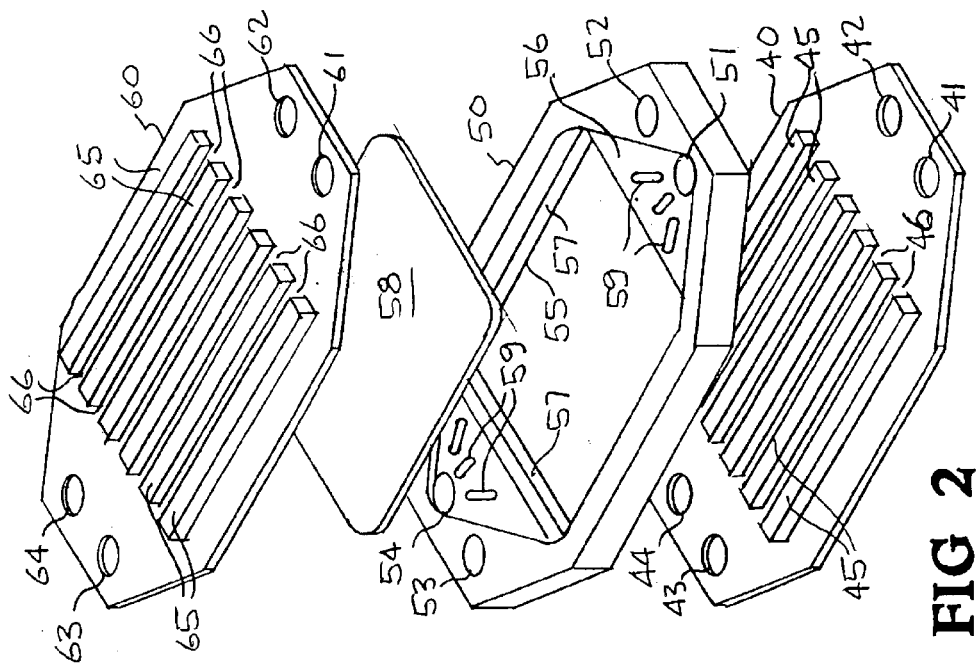
FIG. 1 illustrates a multi-cell stack incorporating a two cell casing/holder and co-flow manifolding of the present invention.
Figure 2:
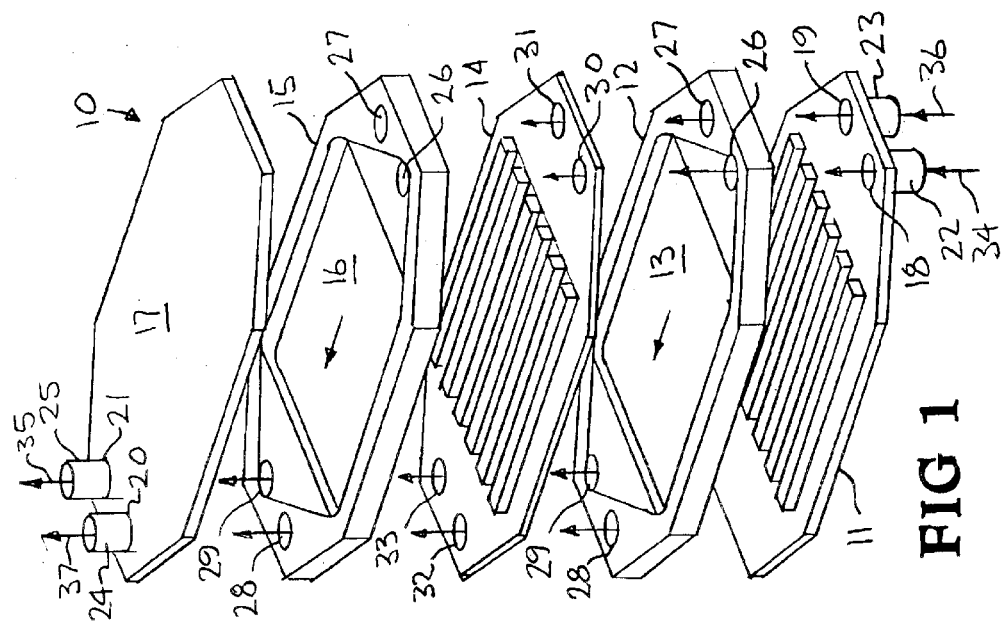
FIG. 2 illustrates an exploded enlarged view of component similar to those of FIG. 1 for providing a single unit of a multi-cell stack.

As seen in FIG. 2 a single cell unit includes a single cell located in a casing/holder plate is sandwiched between an anode plate and a cathode plate, indentified as flow channel/interconnect in FIG. 2. Gas flow is provided to the cell with internal, longitudinal manifolds that are an integral part of the casing/holder plate and the electrode plates, the flow being shown in FIG. 1. Each of the cell casing/holder plate and the electrode plates (flow channel/interconnects) includes two inlets and two outlets for gases. The peripheral surface of the cells are sealed to the surface of the casing/holder plate. This surface sealing of the cell increases effective seal area and improves durability of the seal, as compared to conventional planar designs typically fabricated by edge and/or corner sealing. The FIG. 1 embodiments illustrate a multi-cell assembly utilizing components similar to those of FIG. 2, and shows the co-flow of both air (oxidant) and fuel through the entire stack using manifolds and flow channels in the cathode and anode plates. Note that, as shown in FIG. 1, the outer or end plates include only one pair of gas inlets/outlets, while the inner plates include a pair at each end.

Referring now to the drawings, the multi-cell of FIG. 1, indicated generally at 10, comprises a lower end or outer electrode plate or flow channel/interconnect plate 11, a casing/holder plate 12 retaining therein a cell 13, an intermediate plate or flow channels/interconnect plate 14, a casing/holder plate 15 retaining therein a cell 16, and an upper end or outer plate or flow channel/interconnect plate 17. End plates 11 and 17 are provided with a pair of gas inlets or openings 18–19 and a pair of gas outlets or openings 20–21, respectively, and to which are mounted connects 22–23 and 24–25. The casing/holder plates 12 and 15 are each provided with two pairs of openings 26–27 and 28–29 at opposite ends, and intermediate flow channel/interconnect plate 14 is provided with two pairs of openings 30–31 and 32–33 at opposite ends. The plates 11, 12, 14, 15, 17 when assembled are positioned such that gas inlets or openings 18–19 plate 11 are aligned with openings 26–27 of plates 12 and 15 and openings 30–31 of plate 14, while gas outlets or openings 20–21 of plate 17 are aligned with openings 28–29 of plates 12 and 15, and openings 32–33 of plate 14. Plates 11 and 12 are constructed such that gaseous fuel 34 enters connect 22 in plate 11 and passes through opening 18 in plate 11 and opening 26 in plate 12 where after the fuel flow is divided and passes over cell 13 and through openings 30 in plate 14 and opening 26 in plate 15 and passes over cell 16, as indicated by arrows. The fuel passing over cell 13 passes through opening 33 in plate 14, opening 29 in plate 15 and opening or outlet 21 and connect 25 in plate 17, as shown by arrows and fuel exhaust arrow 35. Fuel passing across cell 16 also enters outlet 21 and connect 25 in plate 17. Air (oxidant) 36 enters connect 23 and inlet 19 in plate 11 and the flow is divided to pass over plate 11 and into opening 27 of plate 12 through opening 31 of plate 14 and across the plate 14 as indicated by arrows. The air passing across plate 11 enters opening 28 in plate 12, opening 33 in plate 14 and joins the air passing across plate 14 and then passes through opening 28 in plate 15, opening 20 and connect 24 in plate 17 as indicated by arrows and is discharged from connect 24 as indicated by air exhaust arrow 37. Top plate 17 and bottom plate 11 has flow channels on one side only, with a flat surface on the outer side as seen in FIG. 1.

The construction of the flow channel/interconnect plates and the cells casing/holder plate is shown in greater detail in FIG. 2. As shown, lower flow channel/interconnect plate 40 is provided with pairs of openings 41–42 and 43–44 and a plurality of spaced protruding members 45 forming flow channels or passageways 46 there between through which air passes at indicated plates 11 and 14 in FIG. 1. Members 45 and flow channels 46 are located on both sides of any center plate, such as plate 14 in FIG. 1, but are located on only one side of plates 40 and 60 in FIG. 2. Cell casing/holder plate 50, similar to plates 12 and 15 of FIG. 1, includes a pair of openings 51–52 and 53–54 at each end, central opening 55 and a cut-away or counter-sink 56 which defines a rim surface or flange 57 on which a cell 58 is mounted in a peripheral surface sealing arrangement. Cutaway 56 is also provided with two sets of angled slots 59 at each end and extending radically from openings 51 and 54 and provide gas flow distribution. Note that the cutaway 56 is configured to include opening 51 at one end and opposite opening 54 at the other end, which allows only passage of fuel across the cell 58 as seen in plates 12 and 15 in FIG. 1. Flow channel/interconnect plate 60 is constructed similar to plate 40 and includes pairs of openings 61–62 and 63–64 at opposite ends and a plurality of spaced members 65 forming passageways 66 there between. As shown, when cell 58 is mounted in plate 50 and plates 40,50 and 60 are assembled, the openings in the plates are in alignment for passage there through of air or fuel, as in FIG. 1.

Should it be desired to form a single cell, the plates 40 and 60 of FIG. 2 would be modified to omit or plug the openings 43–44 in plate 40 and the openings 61–62 in plate 60.

The arrangement of FIG. 1 allows interchange of flows as follows: 1) opening 34; Fuel, 2) opening 36; Air, 3) opening 35; Fuel, and 4) opening 37; Air. Also, these opening can be interchanges to Air (openings 34 & 35) and fuel (openings 36 and 37).

It has thus been shown that the present invention provides a unique stack arrangement which includes a co-flow planar stack with an integral, internal manifold and a cell casing/holder to separately seal the cell. This construction improves sealing and gas flow, and provides for easy manifolding of cell stacks. While the description of the invention has been primarilary directed to a solid oxide fuel cell stack, it can be also utilized in electrolyzers, gas separation systems, etc. which are used in energy production and energy use. The invention has particular application for advanced fuel cells for stationary and transportation power generation. The co-flow arrangement of the present invention may be effectively utilized for planar single cells as well as for planar multi-cell stacks.

While particular embodiments of the invention have been illustrated and described to exemplify and teach the principles of the invention, and such are not intended to be limiting. Modifications and changes may be come apparent to those skilled in the are, and it is intended that the invention be limited only b the scope of the appended claims.

The invention claimed is:

1. In a planar fuel cell stack, the improvement comprising:
   means for providing co-flow of fuel and oxidant gases, and
   means for mounting and surface sealing a cell independently from other stack components so as to provide an increased effective seal area and durability of the seal,
   said means for providing co-flow includes an integral, internal manifold for each of the fuel and oxidant gases,
   said internal manifold including aligned openings in adjacent components.

2. The improvement of claim 1, wherein said means for mounting and surface sealing the cell includes a sealant, and a plate having an aperture and a cut-away section defining a rim area adjacent said aperture, said cell being positioned in the cut-away section of said plate such that a peripheral surface of the cell is located on said rim area and surface sealed thereto via the sealant.

3. The improvement of claim 2, wherein said cut-away section is configured to completely receive the cell therein.

4. The improvement of claim 1, wherein said cell comprises a solid oxide fuel cell.

5. A co-flow planar fuel cell stack, including:
   a first interconnect plate,
   a second interconnect plate,
   a single cell casing/holder plate located between the first and second interconnect plates, said cell casing/holder plate having an aperture and a cut-away section defining a rim section located adjacent said aperture, and
   a fuel cell,
   said first and second interconnect plates and said cell casing/holder plate each having at least one pair of openings therein located in an end section thereof and aligned with an adjacent plate for co-flow of a gaseous fuel and an oxidant therethrough, said fuel cell being positioned in said cut-away section and peripherally mounted on and surface sealed to a surface of the rim section independently from other stack components.

6. The fuel cell stack of claim 5, wherein at least one of said interconnect plates is provided at least one side with members forming flow channels therebetween.

7. The fuel cell stack of claim 5, wherein each of said first and second interconnect plates and said cell casing/holder plate is provided with one pair of openings located in both end sections thereof and wherein said openings in adjacent plates are aligned to provide co-flow of said gaseous fuel and said oxidant therethrough.

8. The fuel cell stack of claim 5, wherein said cell casing/holder plate additionally includes a pair of openings in opposite end sections thereof, and the cut-away section includes an opposite opening of each of said pair of openings.

9. The fuel cell stack of claim 5, additionally including at least one additional interconnect plate, and at least one additional cell casing/holder plate retaining another fuel cell therein, said cell casing/holders plates being sandwiched between two interconnect plates to form a stack of fuel cells, each of said at least one additional interconnect plate and said at least one additional cell casing/holder plates having pairs of openings therein and which are adapted to aligning with openings in an adjacent plate to provide co-flow of the gaseous fuel and oxidant through the entire stack of fuel cells.

10. The fuel cell stack of claim 5, wherein said cut-away section is configured to completely receive the fuel cell therein.

11. A co-flow planar solid oxide fuel cell stacks, comprising:
   a bottom plate having a pair of spaced openings in one end section,
   a plurality of cell casing/holder plates having a pair of spaced openings in each end section thereof,
   a plurality of fuel cells positioned in a corresponding one of said cell casing/holder plates between the end sections and surface sealed to the corresponding cell casing/holder plate independently from other stack components,
   at least one intermediate plate having a pair of spaced openings in each end section thereof, and
   a top plate having a pair of spaced openings in one end section,
   wherein when stacked a pair of said spaced openings in each of said plurality of cell casing/holder plates and a pair of said spaced openings in said at least one intermediate electrode plate align with said pair of spaced openings in said bottom plate, and
   wherein another pair of said spaced openings in each of said plurality of cell casing/holder plates and another pair of said spaced openings in said at least one intermediate electrode plate align with said pair of spaced openings in said top plate,
   thereby forming a co-flow internal manifold for gaseous fuel and oxidant passing through said fuel cell stock.

12. The fuel cell stack of claim 11, wherein at least said bottom plate and said at least one intermediate plate each include a plurality of spaced members forming flow channels therebetween.

13. The fuel cell stack of claim 12, wherein each of said cell casing/holder plates include an aperture and a cutaway section forming a rim surface adjacent said aperture, said fuel cell being positioned in said cutaway section and retained by said rim surface and sealed at the periphery thereof to said rim surface.

14. The fuel cell stack of claim 13, wherein said cutaway section extends around one opening of each pair of spaced openings in said cell/holder plates.

15. The fuel cell stack of claim 14, wherein said cutaway section includes a plurality of radial slots extending from said one opening of each pair of spaced openings.

16. The fuel cell stack of claim 13, wherein said cut-away section is configured to completely receive the fuel cell therein.

17. A co-flow planar fuel cell stack, including:
   at least three interconnect plates including two outer interconnect plates;
   at least two cell casing/holder plates, each sandwiched between two of said interconnect plates and having an aperture and a cut-away section defining a rim section located adjacent said aperture; and
   at least two fuel cells, each positioned in the cut-away section of a corresponding cell casing/holder plate and peripherally mounted on and surface sealed to a surface of the rim section independently from other stack components,
   wherein said plates each have at least one pair of openings therein located in an end section thereof and aligned with openings in an adjacent plate for co-flow of a gaseous fuel and an oxidant therethrough, and
   wherein each outer interconnect plate includes only a single pair of openings in one end section thereof, the pair of openings in one of said outer interconnect plates being operatively connected to supply gaseous fuel and oxidant to the stack of fuel cells, and the pair of openings in another of said outer interconnect plates providing discharge for said gaseous fuel and oxidant from said stack of fuel cells.

18. The fuel cell stack of claim 17, wherein said fuel cells each comprises a solid oxide fuel cell.

19. The fuel cell stack of claim 18, wherein each cut-away section extends around one of said openings of each of said pairs of openings, whereby gaseous fuel passes across a top surface of said fuel cells.

20. The fuel cell stack of claim 19, additionally including a plurality of radially extending slots extending from each of said one of said opening of each of said pairs of openings to provide gas flow distribution.

21. The fuel cell stack of claim 20, wherein certain of said interconnect plates are provided with members forming flow channels therebetween, through which the gaseous oxidant or fuel passes.

* * * * *